US 8,392,760 B2

(12) United States Patent
Kandula et al.

(10) Patent No.: US 8,392,760 B2
(45) Date of Patent: Mar. 5, 2013

(54) DIAGNOSING ABNORMALITIES WITHOUT APPLICATION-SPECIFIC KNOWLEDGE

(75) Inventors: Srikanth Kandula, Redmond, WA (US); Ratul Mahajan, Seattle, WA (US); Patrick D. Verkaik, La Jolla, CA (US); Sharad Agarwal, Seattle, WA (US); Jitendra D. Padhye, Redmond, WA (US); Paramivir Bahl, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 12/579,206

(22) Filed: Oct. 14, 2009

(65) Prior Publication Data

US 2011/0087924 A1     Apr. 14, 2011

(51) Int. Cl.
*G06F 11/32* (2006.01)
(52) U.S. Cl. ............... 714/26; 714/25; 714/46; 714/57
(58) Field of Classification Search .......... 714/25, 714/26
See application file for complete search history.

(56) References Cited

U.S. PATENT DOCUMENTS

| | | | |
|---|---|---|---|
| 6,336,138 B1 | 1/2002 | Caswell et al. | |
| 6,847,970 B2 | 1/2005 | Keller et al. | |
| 7,437,611 B2 | 10/2008 | Agarwal et al. | |
| 7,536,595 B1 * | 5/2009 | Hiltunen et al. | 714/26 |
| 7,669,182 B2 * | 2/2010 | Garcia | 717/108 |
| 2003/0046390 A1 * | 3/2003 | Ball et al. | 709/224 |
| 2003/0046615 A1 * | 3/2003 | Stone | 714/47 |
| 2003/0070108 A1 * | 4/2003 | Groen et al. | 714/1 |
| 2003/0149919 A1 * | 8/2003 | Greenwald et al. | 714/43 |
| 2004/0010716 A1 * | 1/2004 | Childress et al. | 713/201 |
| 2004/0049509 A1 * | 3/2004 | Keller et al. | 707/100 |
| 2004/0128295 A1 * | 7/2004 | Adi et al. | 707/100 |
| 2006/0041659 A1 * | 2/2006 | Hasan et al. | 709/224 |
| 2007/0038899 A1 * | 2/2007 | O'Brien et al. | 714/47 |
| 2008/0027688 A1 * | 1/2008 | Jiang et al. | 703/2 |
| 2008/0059839 A1 * | 3/2008 | Hamilton et al. | 714/26 |
| 2008/0065928 A1 * | 3/2008 | Suzuki et al. | 714/3 |
| 2008/0103749 A1 | 5/2008 | Mead | |
| 2008/0133288 A1 * | 6/2008 | Thibaux et al. | 705/7 |
| 2008/0294777 A1 * | 11/2008 | Karve et al. | 709/226 |

(Continued)

FOREIGN PATENT DOCUMENTS

JP          03111938 A  *  5/1991

OTHER PUBLICATIONS

Aggarwal, et al., "NetPrints: Diagnosing Home Network Misconfigurations Using Shared Knowledge", retrieved on May 24, 2010 at <<http://cseweb.ucsd.edu/~voelker/pubs/netprints-nsdi09.pdf>>, Microsoft Research, Microsoft Corporation, Technical Report MSR-TR-2008-102, 2008, pp. 1-16.

(Continued)

*Primary Examiner* — Scott Baderman
*Assistant Examiner* — Chae Ko
(74) *Attorney, Agent, or Firm* — Lee & Hayes, PLLC

(57) ABSTRACT

Methods, articles, and systems for determining a probable cause of a component's abnormal behavior are described. To determine the probable cause, a computing device computes, for one or more pairs of components having dependency relationships, a likelihood that behavior of one component of a pair is impacting behavior of the other component of the pair. This computing is based on joint historical behavior of the pair of components. The computing device then determines that one of a plurality of components is a probable cause of the abnormal behavior based on the computed likelihoods.

20 Claims, 10 Drawing Sheets

U.S. PATENT DOCUMENTS

| | | | |
|---|---|---|---|
| 2009/0055684 A1* | 2/2009 | Jamjoom et al. | 714/26 |
| 2009/0172470 A1* | 7/2009 | Bobak et al. | 714/16 |
| 2009/0292954 A1* | 11/2009 | Jiang et al. | 714/47 |
| 2010/0058108 A1* | 3/2010 | Nammatsu et al. | 714/4 |
| 2010/0198771 A1* | 8/2010 | Khalak et al. | 706/52 |
| 2010/0281307 A1* | 11/2010 | Ng | 714/40 |

OTHER PUBLICATIONS

Bahl, et al., "Discovering Dependencies for Network Management", retrieved on May 24, 2010 at <<http://conferences.sigcomm.org/hotnets/2006/bahl06discovering.pdf>>, Proceedings of Workshop on Hot Topics in Networks, Nov. 2006, pp. 97-102.

Bahl, et al., "Towards Highly Reliable Enterprise Network Services Via Inference of Multi-level Dependencies", retrieved on May 24, 2010 at <<http://citeseerx.ist.psu.edu/viewdoc/download?doi=10.1.1.102.5779&rep=rep1&type=pdf>>, ACM SIGCOMM Computer Communication Review, Kyoto, JP, vol. 37, No. 4, 2007, pp. 13-24.

Bhatia, et al., "Lightweight, High-Resolution Monitoring for Troubleshooting Production Systems", retrieved on May 24, 2010 at <<http://www.usenix.org/events/osdi08/tech/full_papers/bhatia/bhatia.pdf>>, USENIX Association, Symposium on Operating Systems Design and Implementation (OSD), 2008, pp. 103-116.

Bishop, "Pattern Recognition and Machine Learning", Review retrieved on May 24, 2010 at <<http//research.microsoft.com/en-us/um/people/cmbishop/prml/bishop-ml.pdf>>, Springer New York, 2006.

Borisov, et al., "DIADS: A Problem Diagnosis Tool for Databases and Storage Area Networks", retrieved on May 24, 2010 at <<http://www.cs.duke/edu/~shivnath/papers/diads_demo.pdf>>, VLDB, Proceedings of the VLDB Endowment, Lyon, FR, vol. 2, No. 2, Aug. 2009, pp. 1546-1549.

Brugnoni et al, "An Expert System for Real Time Fault Diagnosis of the Italian Telecommunications Network," In Proceedings: Integrated Network Management, 1993, pp. 617-628.

Chen, et al., "Automating Network Application Dependency Discovery: Experiences, Limitations, and New Solutions", retrieved on May 24, 2010 at <<http://research.microsoft.com/pubs/136789/orion.pdf>>, USENIX Association, Symposium on Operating Systems Design and Implementation (OSDI), 2008, pp. 117-130.

Chen, et al., "Failure Diagnosis Using Decision Trees", retrieved on May 24, 2010 at <<http://www.cs.berkeley.edu/~brewer/papers/icac2004_chen_diagnosis.pdf>>, International Conference on Automatic Computing (ICAC), New York, NY, May 2004, pp. 36-43.

Chen, et al., "Pinpoint: Problem Determination in Large, Dynamic Internet Services", retrieved on May 24, 2010 at <<http://roc.cs.berkeley.edu/papers/roc-pinpoint-ipds.pdf>>, IEEE Computer Society, International Performance and Dependability Symposium (IPDS/DSN), Jun. 2002, pp. 595-604.

Cohen, et al., "Correlating instrumentation data to system states: A building block for automated diagnosis and control", retrieved on May 24, 2010 at <<http://www.usenix.org/events/osdi04/tech/full_papers/cohen/cohen.pdf>>, USENIX Association, Symposium on Operating Systems Design and Implementation (OSDI), San Francisco, CA, vol. 6, 2004, pp. 231-244.

Deligiannakis, et al., "Compressing Historical Information in Sensor Networks", retrieved on May 24, 2010 at <<http://pages.cs.aueb.gr/~kotidis/Publications/sigmod2004.pdf>>, ACM SIGMOD International Conference on Management of Data, Paris, FR, Jun. 2004, pp. 527-538.

Garofalakis, et al., "Wavelet Synopses with Error Guarantees", retrieved on May 24, 2010 at <<http://www.pittsburgh.intel-research.net/people/gibbons/papers/wavelets-sigmod02.pdf>>, ACM SIGMOD International Conference on Management of Data, Madison, WI, 2002, pp. 476-487.

Gray, "Why do computers stop and what can be done about it?", retrieved on May 24, 2010 at <<http://www.google.com/url?sa=t&source=web&ct=res&cd=3&ved=0CBwQFjAC&url=http%3A%2F%2Fciteseerx.ist.psu.edu%2Fviewdoc%2Fdownload%3Fdoi%3D10.1.1.110.9127%26rep%3Drep1%26type%3Dpdf&rct=j&q=Why+do+computers+stop+and+what+can+be+done+about+it&ei=jIp6S-_HDqDMMZPy_LsF&usg=AFQjCNG5Y-ikfonQ4omm8LaFelid8wJ7GQ>>, Tandem Technical Report TR 85,7, 1985, pp. 1-24.

Gteko, Inc., http://www.gteko.com, retrieved at <<http://web.archive.org/web/20071010055427/http://www.gteko.com/>>, available as early as Oct. 10, 2007, 1 pg.

Gustafsson, "Adaptive Filtering and Change Detection", retrieved on May 24, 2010 at <<http://saba.kntu.ac.ir/eecd/taghirad/E%20books/TOC/Adaptive%20filtering%20and%20change%20detection.pdf>>, John Wiley & Sons, 2000, pp. 1-510.

Hamscher et al, "Readings in Model-based Diagnosis," Morgan Kaufmann Publishers Inc., Jul. 1992.

Heckerman, "A Tutorial on Learning With Bayesian Networks", retrieved on May 24, 2010 at <<ftp://ftp.research.microsoft.com/pub/tr/tr-95-06.pdf>>, Microsoft Research, Microsoft Corporation, Technical Report MSR-TR-95-06, 1995, pp. 1-58.

Hyvarinen, et al., "Independent Component Analysis: Algorithms and Applications", retrieved on May 24, 2010 at <<http://www.cs.helsinki.fi/u/ahyvarin/papers/NN00new.pdf>>, Elsevier Science Ltd., Oxford, UK, Neural Networks, vol. 13, No. 4/5, 2000, pp. 411-430.

Ishida, "Fully Distributed Diagnosis by PDP Learning Algorithm: Towards Immune Network PDP Model", retrieved on May 24, 2010 at <<http://ieeexplore.ieee.org/stamp/stamp.jsp?tp=&arnumber=137663&userType=inst>>, Proceedings of International Joint Conference on Neural Networks (IJCNN), San Diego, CA, 1990, pp. 777-782.

Jagadish, et al., "Similarity-Based Queries", retrieved on May 24, 2010 at <<http://citeseerx.ist.psu.edu/viewdoc/download;jsessionid=524D3E0BD7E36F8987C5F0D47D4E9177?doi=10.1.1.38.6882&rep=rep1&type=pdf>>, ACM, Proceedings of Symposium on Principles of Database Systems, San Jose, CA, 1995, pp. 36-45.

Khanna, et al., "Automated Rule-Based Diagnosis Through a Distributed Monitor System", retrieved on May 24, 2010 at <<http://cobweb.ecn.purdue.edu/~dcsl/publications/papers/2007/final_tdsc_minorrevision_submit.pdf>>, IEEE Transactions on Dependable and Secure Computing, vol. 4, No. 4, 2007, pp. 266-279.

Kompella, et al., "IP Fault Localization Via Risk Modeling", retrieved on May 24, 2010 at <<http://kailash.ucsd.edu/~ramana/papers/nsdi05.pdf>>USENIX Association, Proceedings of Symposium on Networked Systems Design and Implementation, 2005, pp. 57-70.

Lee, et al., "A Scalable Architecture for Network Fault Diagnosis in the Knowledge Plane", retrieved on May 24, 2010 at <<http://people.csail.mit.edu/gjl/research/publications/lee05csw-diagnosis.pdf>>, Computer Science and Artificial Intelligence Laboratory (CSAIL), Proceedings of the Student Workshop (CSW), Cambridge, MA, 2005, pp. 1-2.

"Looking for HP OpenView?", retrieved on May 25, 2010 at <<http://www.openview.hp.com>>, Hewlett-Packard Development Company, 2010, pp. 1.

Mahajan, et al., "Understanding BGP Misconfiguration", retrieved on May 24, 2010 at <<http://www.google.com/url?sa=t&source=web&ct=res&cd=0CB0QFjAC&url=http%3A%2F%2Fciteseerx.ist.psu.edu%2Fviewdoc%2Fdownload%3Fdoi%3D10.1.1.20.1862%26rep%3Drep1%26type%3Dpdf&rct=j&q=Understanding+BGP&ei=KUb6S6CqE4_4Mdnf2YMI&usg=AFQjCNGZX0nWI34wnZY8JtBklqJYwd3m3Q>>, ACM, Proceedings of Applications, Technologies, Architectures, and Protocols for Computer Communication, Pittsburgh, PA., 2002, pp. 3-16.

Muirhead, "Microsoft Operations Manager 2005", retrieved on May 24, 2010 at <<http://technet.microsoft.com/en-us/opsmgr/bb498244.aspx>>, Dell Power Solutions, Aug. 2006, pp. 1-7.

Oppenheimer, et al., "Why do Internet services fail, and what can be done about it?", retrieved on May 24, 2010 at <<http://roc.cs.berkeley.edu/papers/usits03.pdf>>, USENIX Association, Symposium on Internet Technologies and Systems (USITS), Seattle, WA, vol. 4, 2003, pp. 1-15.

Pearl, "Causality : Models, Reasoning, and Inference," Econometric Theory, 19, 2003Cambridge University Press, 2003, pp. 675-685.

Performance Counters (Windows), retrieved on May 25, 2010 at <<http://msdn.microsoft.com/en-us/library/aa373083(VS.85).aspx>>, Microsoft Corporation, 2010, pp. 1.

Popivanov, et al., "Similarity Search Over Time—Series Data Using Wavelets", retrieved on May 24, 2010 at <<http://www.google.com/url?sa=t&source=web&ct=res&cd=2&ved=0CCcQFjAB&url=http%3A%2F%2Fciteseerx.ist.psu.edu%2Fviewdoc%2Fdownload%3Fdoi%3D10.1.1.104.9016%26rep%3Drep1%26type%3Dpdf&rct=j&q=Similarity+search+over+time-series+data&ei=qk36S6G5OoOwMtHGjLkF&usg=AFQjCNEU0KSr5c-wSYupKAVrmhgWrMBhAg>>, IEEE Computer Society, Proceedings of International Conference on Data Engineering (ICDE), San Jose, CA, 2002, pp. 1-10.

Rafiei, et al., "Similarity-Based Queries for Time Series Data", retrieved on May 24, 2010 at <<http://arxiv.org/PS_cache/cs/pdf/9809/9809023v2.pdf>>, Proceedings of the ACM, SIGMOD International Conference on Management of Data, Tucson, AZ, May 1997, pp. 13-24.

Singh, et al., "DYSWIS: An Architecture for Automated Diagnosis of Networks", retrieved on May 24, 2010 at <<http://ieeexplore.ieee.org/stamp/stamp.jsp?tp=&arnumber=4575230>>, IEEE/IFIP, Network Operations and Management Symposium (NOMS), Salvador, BR, 2008, pp. 851-854.

Su, et al., "AutoBash: Improving configuration management with operating system causality analysis", retrieved on May 24, 2010 at <<http://www.google.com/url?sa=t&source=web&ct=res&cd=3&ved=0CCYQFjAC&url=http%3A%2F%2Fciteseerx.ist.psu.edu.%2Fviewdoc%2Fdownload%3Fdoi%3D10.1.1.116.8622%26rep%3Drep1%26type%3Dpdf&rct=j&q=configuration+management+with+operating+system+causality+analy&ei=AE_6S4CNIoSONtDG5IMI%usg=AFQjCNFq8e17vTd9kwYwJNXizKbgqlHTyQ>>, ACM, Symposium on, Oct. 2007.

Verbowski, et al., "Flight Data Recorder: Monitoring Persistent-State Interactions to Improve Systems Management", retrieved on May 25, 2010 at <<http://www.usenix.org/event/osdi06/tech/full_papers/verbowski/verbowski_html>>, USENIX Association, Proceedings of Symposium on Operating Systems Design and Implementation (OSDI), 2006, pp. 117-130.

Wang, et al., "Automatic Misconfiguration Troubleshooting with PeerPressure", retrieved on May 24, 2010 at <<http://research.microsoft.com/en-us/people/helenw/papers/peerpressureosdi.pdf>>, USENIX Association, Proceedings of Symposium on Opearting Systems Design and Implementation (OSDI), San Francisco, CA, vol. 6, 2004, pp. 1-13.

Wang, et al., "STRIDER: A Black-box, State-based Approach to Change and Configuration Management and Support", retrieved on May 24, 2010 at <<http://research.microsoft.com/pubs/69043/lisa.pdf>>, USENIX Association, Proceedings of System Administration Conference, (LISA), San Diego, CA, 2003, pp. 159-172.

Whitaker, et al., "Configuration Debugging as Search: Finding the Needle in the Haystack", retrieved on May 24, 2010 at <<http://www.usenix.org/events/osdi04/tech/full_papers/whitaker/whitaker.pdf>>, USENIX Association, Symposium on Operating Systems Design and Implementation (OSDI), 2004, pp. 77-90.

Yemini, et al., "High Speed and Robust Event Correlation", retrieved on May 24, 2010 at <<http://research.microsoft.com/en-us/um/people/alicez/papers/ieeecomm96.pdf>>, IEEE Communications Magazine, May 1996, pp. 82-90.

Zhao, "Towards Noise-Tolerant: Network Service Diagnosis", retrieved on May 24, 2010 at <<http://www2.research.att.com/~jiawang/sstp08-camera/SSTP08_Zhao.pdf>>, ACM Sigmetrics, International Conference on Measurement and Modeling of Computer Systems, Annapolis, MD, Jun. 2008, pp. 1-2.

* cited by examiner (Background)

DIAGNOSING ABNORMALITIES WITHOUT APPLICATION-SPECIFIC KNOWLEDGE

BACKGROUND

Modern networks have many components that interact in complex ways. Changes to the performance or behavior of one component can have a dramatic impact on other components that are in communication with or in some way dependant on the changed component, causing abnormal behavior on all components impacted.

For example, as shown in FIG. 1, an abnormally performing SQL client 102 can impact the behavior of SQL server 104 and another SQL client 106. Abnormal behavior could represent behavior that is either improved or diminished with respect to historical behavior and/or expected behavior. Here, in FIG. 1, the abnormal behavior causes the SQL client 102 to send a larger-than-expected volume of requests 108. Because of the volume of requests 108, SQL server 104 may become less efficient at answering requests, causing longer delays between request submissions and responses. When SQL client 106 submits its expected volume of requests 110, then, it will have to wait longer to receive responses to those requests. This delay in receiving responses can also impact other processes on the SQL client 106, such as application processes utilizing SQL requests and responses. Accordingly, as can be seen in FIG. 1, a problem causing abnormal behavior of one component can impact a large number of other components, causing those other components to behave abnormally as well.

Abnormal behavior of components, as shown in FIG. 1, occurs within both large and small networks. For large networks, there are techniques that are capable of determining which machine on the network is the cause of the abnormal behavior. There are also techniques for determining the cause of the abnormal behavior that require extensive domain knowledge, such as knowledge of each application's dependencies and failure modes.

SUMMARY

Techniques and systems for determining a probable cause of a component's abnormal behavior are described. The component, such as a network component, may be one of a plurality of components and may impact and be impacted by the behavior of others of the components. To determine the probable cause of the abnormal behavior, a computing device may compute, for one or more pairs of that components that have dependency relationships, a likelihood that behavior of one component of a pair is impacting behavior of the other component of the pair. This computing is based on joint historical behavior of the pair of components. The computing device may then determine that one of a plurality of components is a probable cause of the abnormal behavior based on the computed likelihoods.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
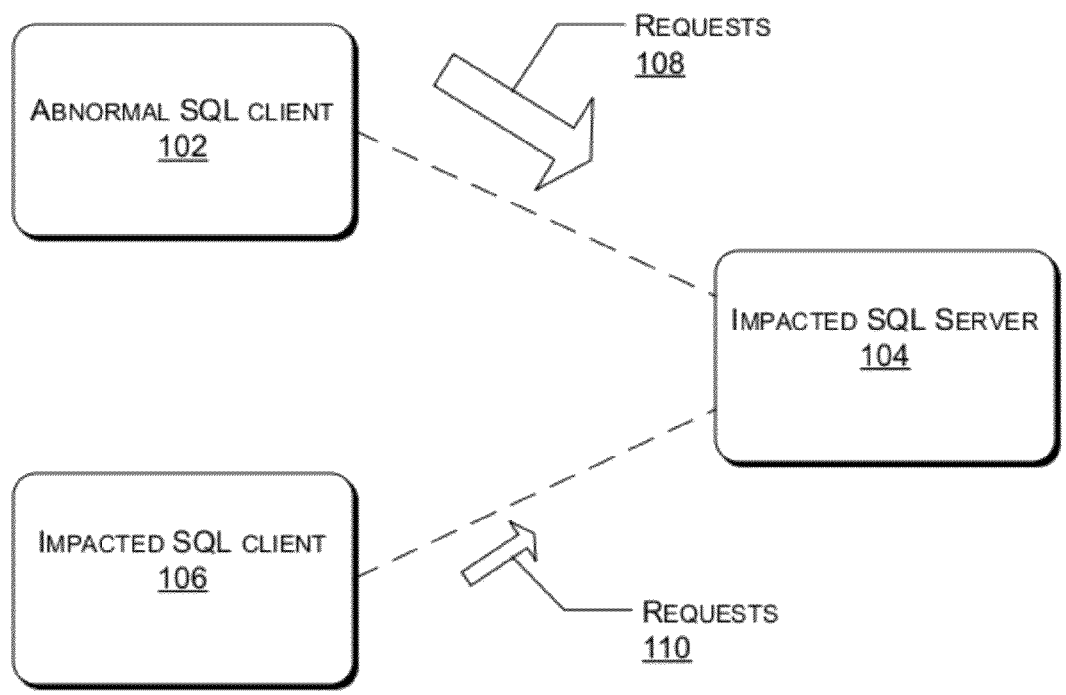
FIG. 1 illustrates the impact of an abnormally performing system on other systems associated with the abnormally performing system.

Described herein are techniques for diagnosing a probable cause of abnormal behavior affecting a network. The techniques may identify the probable cause with a fine granularity by monitoring behavior and/or status of components, including network components, such as applications, operating systems, and network connections, among others, considering each separately rather than calculating an aggregate health score for computing devices of the network. The techniques may further utilize joint historical behavior of network components to determine whether one network component is impacting the behavior or status of another. By utilizing the joint historical behavior, the techniques can determine the impact of one network component on another without any domain knowledge about the network components, such as domain knowledge about semantics of the behavior metrics of the network components.

To determine the probable cause, behavior metrics may be collected for the network components of a network. The network may previously have been partitioned into the network components, and monitoring agents may have been installed on devices of the network to collect behavior metrics for network components associated with each device. The behavior metrics may then be used to build a representation of joint historical behavior of the network components, including representations of the state of each network component at a given time.

Concurrently while collecting the behavior metrics or independently of the collection, a diagnostic system may generate a dependency graph of the network, representing each network component as a node and each dependency relationship between a pair of network components as an edge between the two nodes. The dependency graph can then be used by the diagnostic system, along with the joint historical behavior, in determining a probable cause of abnormal behavior of network components.

Also, while collecting behavior metrics, the diagnostic system may analyze the metrics to detect abnormal behavior of one or more network components. Also, or instead, the diagnostic system may receive an indication of abnormal behavior from an operator of the network. Upon detecting abnormal behavior or receiving an indication of abnormal behavior, the diagnostic system may proceed to determine the probable cause of the detected/indicated abnormal behavior.

To determine the probable cause, the diagnostic system may first calculate likelihoods for pairs of network components that behavior of one network component of the pair is impacting the behavior of the other. For pairs of network components where each component of the pair is behaving abnormally, the diagnostic system may utilize the joint historical behavior of those components to compute the likelihoods for each pair. The computed likelihoods for each pair may then be assigned as edge weights to corresponding edges in the dependency graph. Once edge weights have been assigned to each edge of the dependency graph, the diagnostic system can determine a ranking of network components as probable causes of the abnormality. To determine the ranking, the diagnostic system may calculate measures of an impact of a first component on a second component based on the computed likelihoods and scores of the impact of each network component on every other component. These measures and scores may then be utilized to calculate the ranking.

Once the ranking of probable causes is determined, the diagnostic system may provide an indication of the ranking to an operator of the affected network. For example, the indication may be provided through a user interface. Also or instead, the diagnostic system may provide the ranking to a rule-based engine that is capable of determining and/or applying a remedy for the abnormal behavior, or may provide the ranking to a knowledge base of faults and causes to receive, in return, a recommended course of action.

Reference is repeatedly made herein to "abnormal behavior" of network components. As used herein, "abnormal behavior" refers to any behavior of a network component or status of a network component that varies from a behavior or status that would be expected based on historical behavior of the network component. Such behavior may be "improved" or "diminished", with what is considered "improved" or "diminished" varying from embodiment to embodiment. Likewise, "normal" behavior refers any behavior of a network component or status of a network component which is consistent with a behavior or status that would be expected based on historical behavior of the network component.

Reference is also made herein to "small networks" and "large networks." As used herein, a "small network" refers a network having a relatively small number of computing devices, such as, for example, a hundred or fewer computing devices. Such a network may also comprise only a single geographic location. A "large network," in contrast, may have hundreds or thousands of computing devices and may be in a single location or in multiple locations. What is considered a "small network" or a "large network" may vary from embodiment to embodiment.

Figure 2:
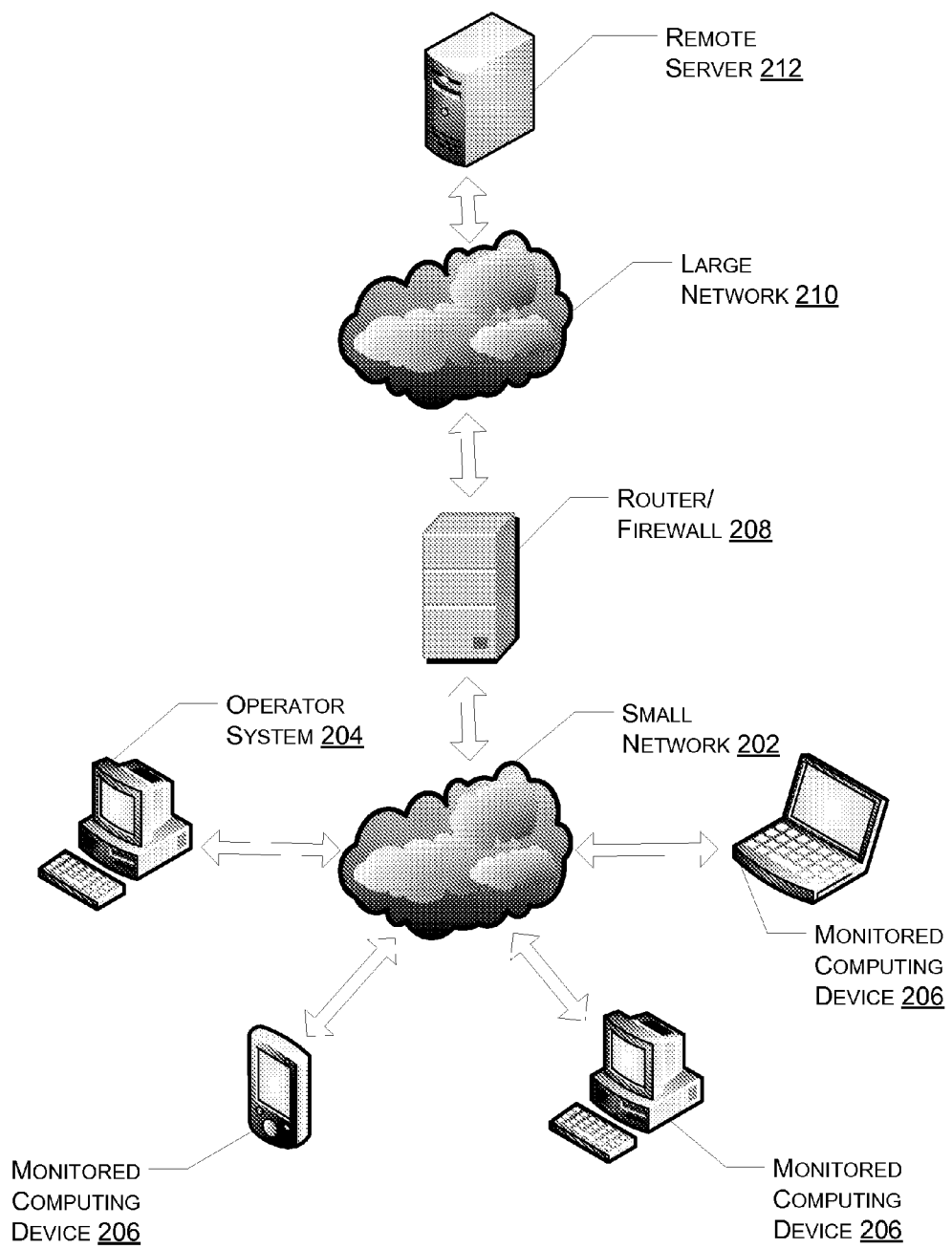
FIG. 2 illustrates a plurality of computing devices and networks involved in monitoring and/or diagnosing abnormal behavior of a component of one or more monitored devices.

FIG. 2 shows a plurality of computing devices and networks involved in monitoring and/or diagnosing abnormal behavior of a component of one or more monitored devices. As illustrated, a small network 202 is connected to an operator system 204, a plurality of monitored computing devices 206, and a router/firewall 208. The router/firewall 208 may in turn be connected to a large network 210 and may provide connectivity between devices of the small network 202 and those of the large network 210. Also connected to the large network 210 may be a remote server 212, which may communicate with one or more of devices/systems 204-208 through the networks 202 and 210.

In various implementations, small network 202 represents any one or more networks known in the art, including wide area networks (WANs), local area networks (LANs), and/or personal area networks (PANs). Wired or wireless connection between one devices of the small network 202 may be through a number or routers and/or or other devices acting as bridges between data networks. Communications between the devices of small network 202 may utilize any sort of communication protocol known in the art for sending and receiving messages, such as the Transmission Control Protocol/Internet Protocol (TCP/IP) and/or the Hypertext Transfer Protocol (HTTP).

Figure 9:
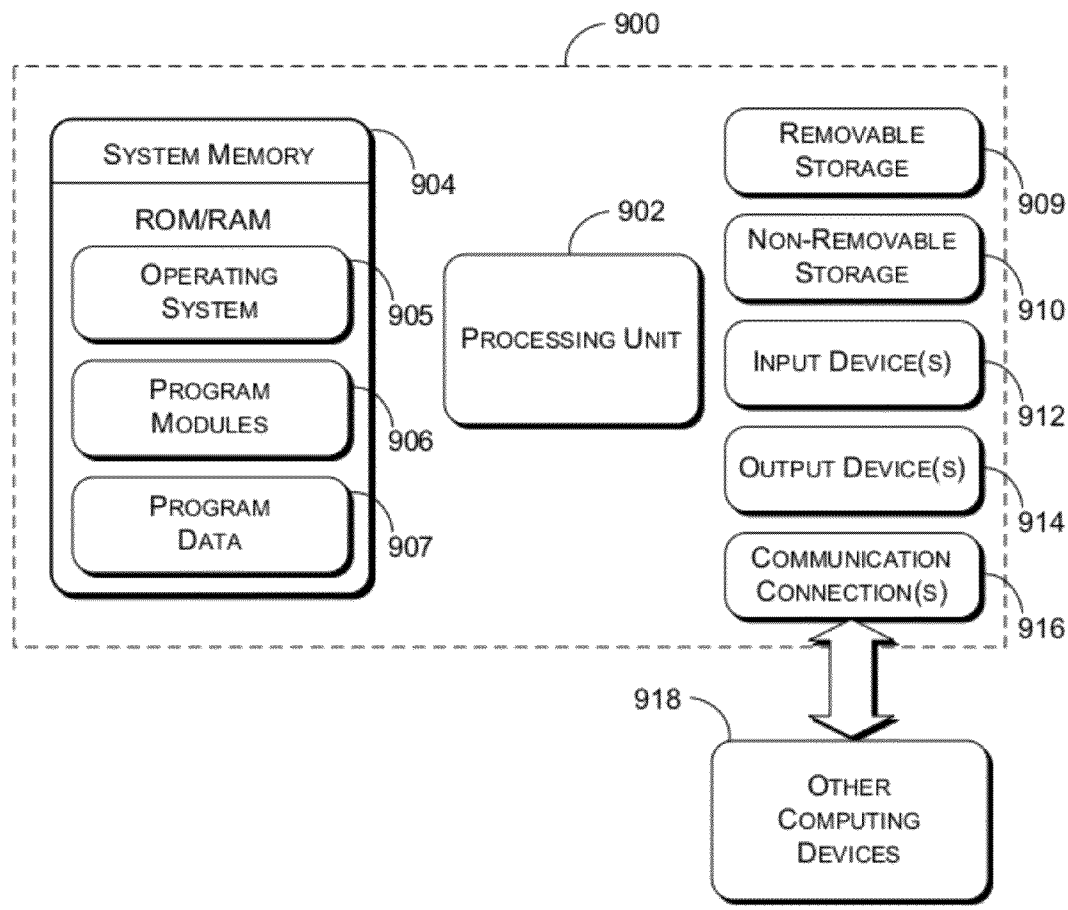
FIG. 9 illustrates a block diagram showing components of a computing device such as a monitored computing device or a diagnostic system.

The operator system 204, monitored computing devices 206, router/firewall 208, and remote server 212 may each be a personal computer (PC), a laptop computer, a workstation, a server system, a mainframe, a telecommunications device, a personal digital assistant (PDA), a set-top box, or any other computing device known in the art. In some implementations, operator system 204, monitored computing devices 206, router/firewall 208, and remote server 212 may each be a virtual machine implemented on one or more computing devices. Additional hardware and software components that each of the operator system 204, monitored computing devices 206, router/firewall 208, and remote server 212 may possess are illustrated in FIG. 9 and described in greater detail below with reference to that figure.

The operator system 204 represents a computing device associated with an operator or administrator of the small network 202 who has administrative privileges over the small network 202 and over devices of the small network 202. In some embodiments, the operator system 204 may be an internal router of the small network 202, while in other embodiments it may simply be a computing device that interfaces with such a router. In one implementation, in addition to having administrative functions, the operator system 204 implements the diagnostic system 400 shown in FIG. 4 and described in greater detail herein. If implementing the diagnostic system 400, the operator system 204 may interact with the monitored computing devices 206 to receive behavior metrics from the monitored computing devices 206. The operator system 204 may then utilize the behavior metrics to detect abnormal behavior of a component, such as a network component, associated with one or more of the monitored computing devices 206. In one implementation, the operator system 204 presents the metrics to an operator and enables the operator to indicate whether the behavior metrics manifest abnormal behavior. Once abnormal behavior is detected or indicated, the operator system 204 may determine the probable cause of the abnormal behavior in the manner described in greater detail below.

Figure 3:
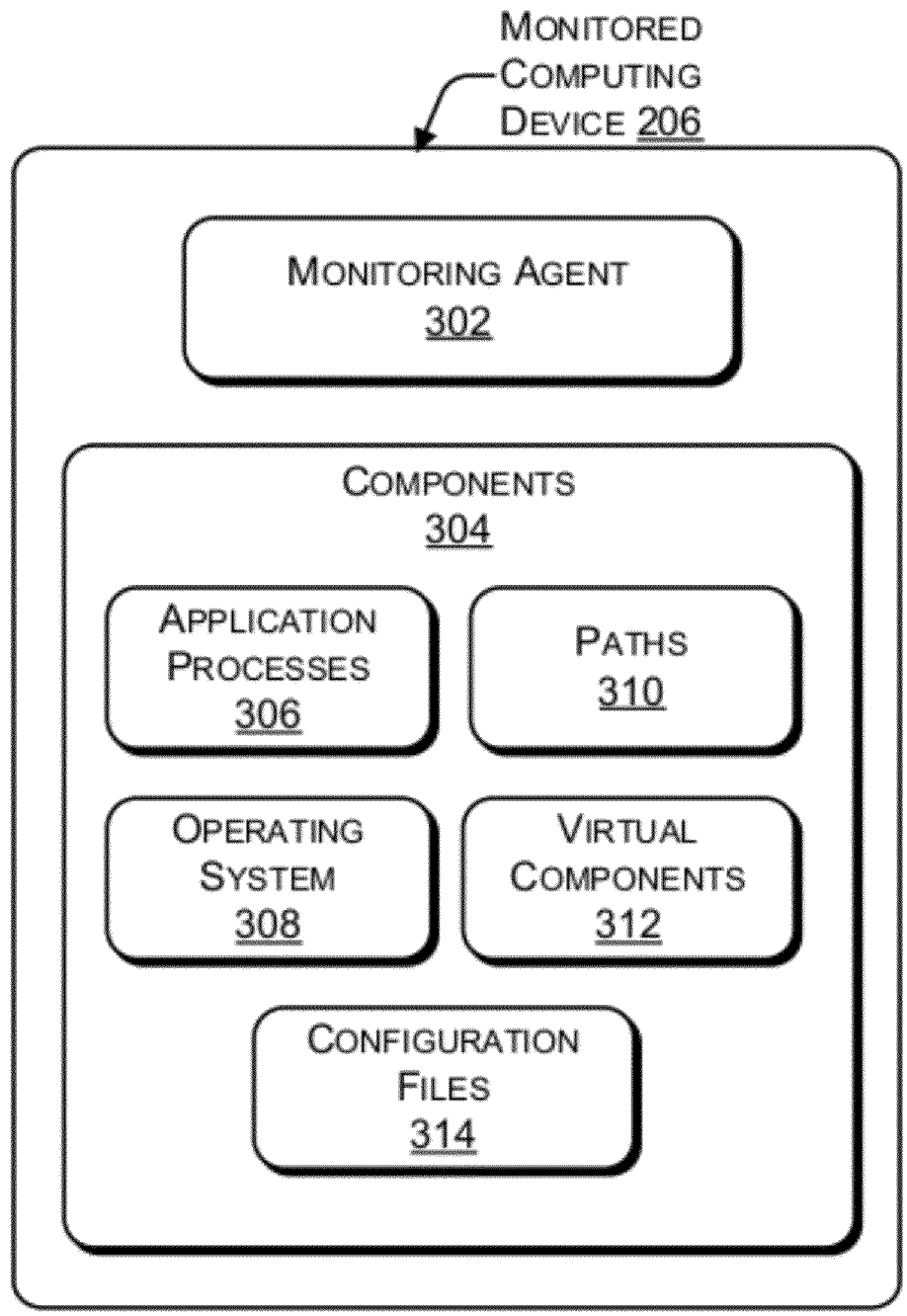
FIG. 3 illustrates an example architecture of a monitored computing device.

In various implementations, monitored computing devices 206 are any devices belonging to small network 202 that perform any function or role. In one implementation, monitored computing devices 206 include either or both of the operator system 204 and the router/firewall 208. The monitored computing devices 206 may in turn each comprise a monitoring agent and a plurality of components, such as network components, as illustrated in FIG. 3 and described further herein. Using the monitoring agent, any one of the monitored computing devices 206 may gather behavior metrics that capture the behavior of the network components comprising all or some of the monitored computing devices 206 and may provide the metrics to a computing device implementing the diagnostic system 400 (shown in and described with regard to FIG. 4). In one implementation, any of the monitored computing devices 206 may implement the diagnostic system 400 (see FIG. 4). When each device 206 implements the diagnostic system 400, the device 206 need only track behavior metrics of the network components on that device and of those on other devices in communication with the device. As mentioned with regard to the operator system 204, when implementing a diagnostic system 400, the monitored computing device 206 may detect or receive an indication of abnormal behavior of one of its network components and determines a probable cause of that abnormal behavior.

As is further shown in FIG. 2, the router/firewall 208 may be any device bridging small network 202 and large network 210 which provides routing and/or firewall services to small network 202. Such routing and firewall services are well known in the art and, accordingly, will not be described further. In one implementation, the router/firewall 208 may implement the diagnostic system 400 (see FIG. 4) and provide diagnostic services for monitored computing devices 206 of the small network 202. Also, in some implementations, the router/firewall 208 and operator system 204 may in fact be the same computing device.

In various implementations, the large network 210 represents any one or more networks known in the art, such as cellular networks and/or data networks, including wide area networks (WANs), local area networks (LANs), personal area networks (PANs), and/or the Internet. A connection between the router/firewall 208 and other devices of the large network 210, such as the remote server 212, may be through a number or routers, base stations, and/or devices acting as bridges between cellular and data networks or between data networks themselves. Communications between the router/firewall 208 and other devices of the large network 210 may utilize any sort of communication protocol known in the art for sending and receiving messages, such as the Transmission Control Protocol/Internet Protocol (TCP/IP) and/or the Hypertext Transfer Protocol (HTTP).

The remote server 212 may be any sort of computing device in communication with one or more devices of the small network 202 through the large network 210, the router/firewall 208, and the small network 202. In various implementations, the remote server 212 implements the diagnostic system 400 shown in FIG. 4 and described in greater detail herein. If implementing the diagnostic system 400, the remote server 212 may interact with the monitored computing devices 206 to receive behavior metrics from the monitored computing devices 206. The remote server 212 may then utilize the behavior metrics to detect abnormal behavior of a network component associated with one or more of the monitored computing devices 206. In one implementation, the remote server 212 presents the metrics to a user and enables the user to indicate whether the behavior metrics manifest abnormal behavior. Once abnormal behavior is detected or indicated, the operator system 204 may determine the probable cause of the abnormal behavior in the manner described in greater detail below.

FIG. 3 illustrates an example architecture of a monitored computing device in accordance with various embodiments of diagnosing network abnormalities based on behavior metrics. As shown in FIG. 3, a monitored computing device 206 includes a monitoring agent 302 and a plurality of components 304.

In various implementations, the monitoring agent 302 may be a set of executable instructions installed by the diagnostic system 400 (see FIG. 4) or by some other computing device that is configured to collect behavior metrics for a plurality of components 304 of the monitored computing device 206. The monitoring agent 302 may be configured to discover the components 304 and all metrics of behavior or status of those components 304 that are exposed by the monitored computing device 206. For example, the monitored computing device 206 may already collect and make available metrics such as computer processing unit (CPU) utilization, memory usage, disk usage, amount of network traffic and other input and output, response times, loss rate, delay, and key-value pairs. In one implementation the metrics collected may be behavior counters such as those made available by the Windows® Performance Counter framework. While most behavior counters represent values since the last time they were read, some counters, such as the number of exceptions, are cumulative across time periods. For such counters, the monitoring agent 302 may be able to calculate the difference since the last reading. In a further implementation, the monitoring agent 302 includes a custom utility that snoops on socket-level read and write calls of processes to determine which processes of a network are communicating with each other. The utility may determine the quantity of traffic exchanged and response times.

In some implementations, the monitoring agent 302 may collect the metrics on a predetermined basis, such as every n seconds or minutes. In other implementations, the monitoring agent 302 may serve as a listener that detects and collects new behavior metrics of status information when those metrics or status information change. The monitoring agent 302 also may interact with a monitoring component of a diagnostic system 400 in a push or a pull manner, with the monitoring agent 302 either awaiting a request for metrics before reporting them or automatically reporting the metrics on some basis, such as when they are collected.

As illustrated, the components 304 can include components such as application processes 306, operating system(s) 308, network paths 310, virtual components 312, and configuration files 314. Components 304 can also include any number of network components not shown here. Such components can be any process, file, or connection that could directly or indirectly influence a network, such as small network 202. Application processes 306, for example, may interact with other processes on other devices of a network and may depend on and be influenced by an operating system 308 and/or a configuration file 314. A network connection, such as paths 310, inherently involves network communication and thus influences a network. Each of these components 304 may be associated with a plurality of behavior metrics, such as the metrics mentioned above. In one embodiment, these multiple metrics may be considered as defining a state of the component 304 with which they are associated. As mentioned above, one or more of these metrics may at some time indicate that a network component is performing abnormally. Such abnormal behavior may be caused by many seemingly insignificant factors, such as a configuration change, another component on the network hogging a resource, or a software upgrade.

In various implementations, components 304 can also include virtual components 312. Virtual components 312 may actually be collections of components 304 treated as a single network component for monitoring purposes. For example, one virtual component 312 may represent the collective behavior of communication peers of an application process 306. Such a component may represent information such as traffic exchanged and response times aggregated based on the server-side port of the peers. Another virtual component 312 may, for example, represent drivers, an operating system 308, and other software of a monitored computing device 206 that collectively influence the behavior of application processes and network connections.

Figure 4:
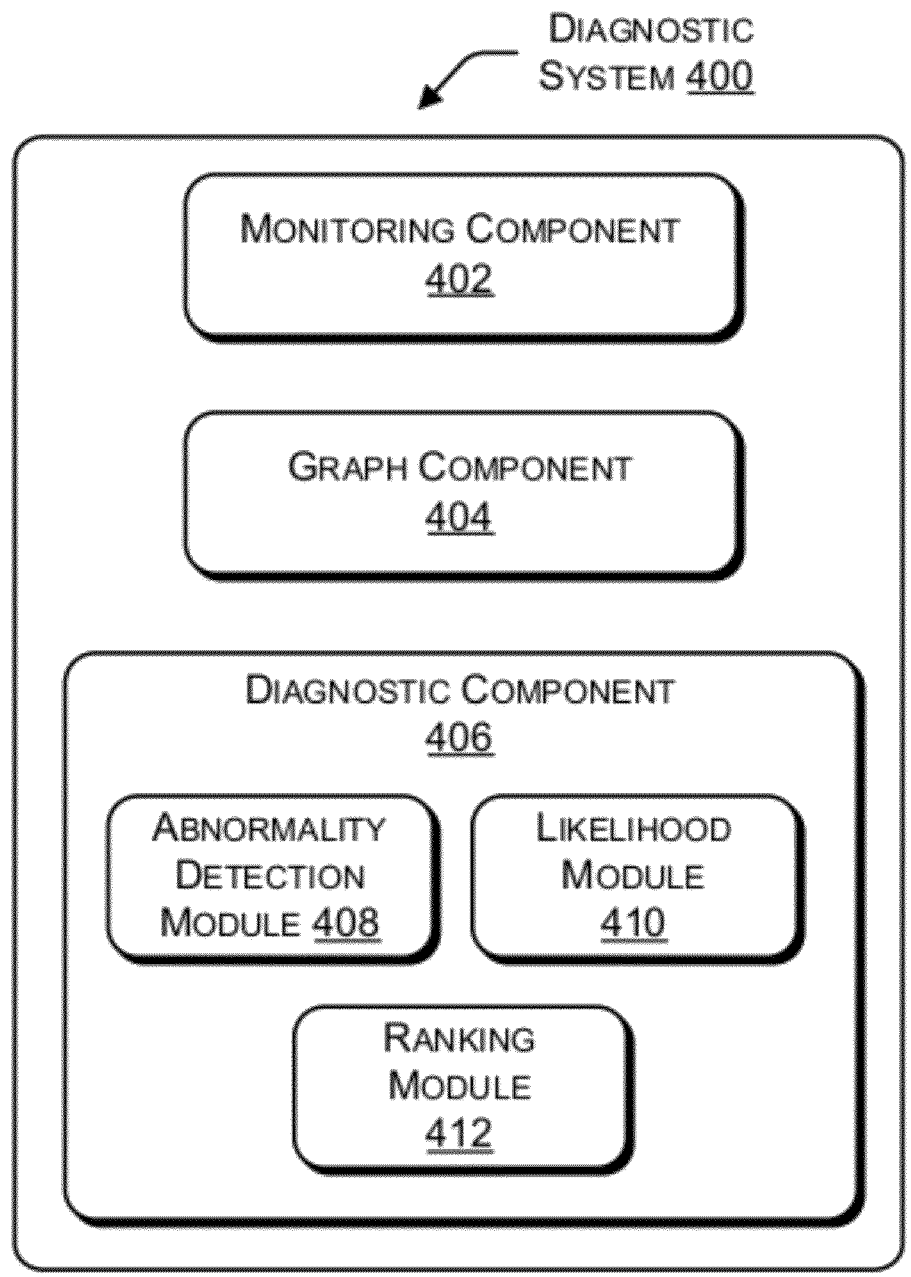
FIG. 4 illustrates an example embodiment of an architecture of a computing device configured to diagnose a probable cause of abnormal behavior of a component.

FIG. 4 illustrates an example architecture of a computing device configured to diagnose a probable cause of abnormal behavior of a component. As illustrated, a diagnostic system 400 includes a monitoring component 402 for receiving behavior metrics of components, a graph component 404 for creating a dependency graph of components and their dependency relationships, and a diagnostic component 406 for determining a probable cause of abnormal behavior of a monitored component. As is further shown in FIG. 4, the diagnostic component 406 includes an abnormality detection module 408 to detect abnormal behavior of a component based on the behavior metrics, a likelihood module 410 to compute likelihoods for pairs of components that one component of each pair is impacting the behavior of the other network of that pair, and a ranking module 412 to determine a ranking of probable causes of abnormal behavior based on the computed likelihoods.

In various implementations, the monitoring component 402 receives behavior metrics for a plurality of components, such as network components. As described above, a monitoring agent 302 of a monitored computing device 206 may provide such behavior metrics. Such metrics may be received by the monitoring component 402 in a push or a pull manner, and may be received periodically.

As the monitoring component 402 receives the behavior metrics, the monitoring component 402 may calculate averages of each metric for a given time range (or "time bin"). For example, for the CPU utilization (behavior metric) of an application process (network component), the monitoring component 402 may calculate an average of the CPU utilization over an n minute time range.

The monitoring component 402 may then store either the averages over the time ranges or the actual received behavior metrics in a representation of the joint historical behavior for the network components. The representation may be implemented as a database, a table, or as any sort of data structure. Each network component may be associated with a set of instances of a multi-variable vector stored in the representation, with the vector including a variable for each behavior metric of the network component. The set of behavior metrics at a single point in time (or in a single time range) may comprise the state of the network component at that point in time and may further comprise a single instance of the multi-variable vector for the network component at that point in time.

Figure 5:
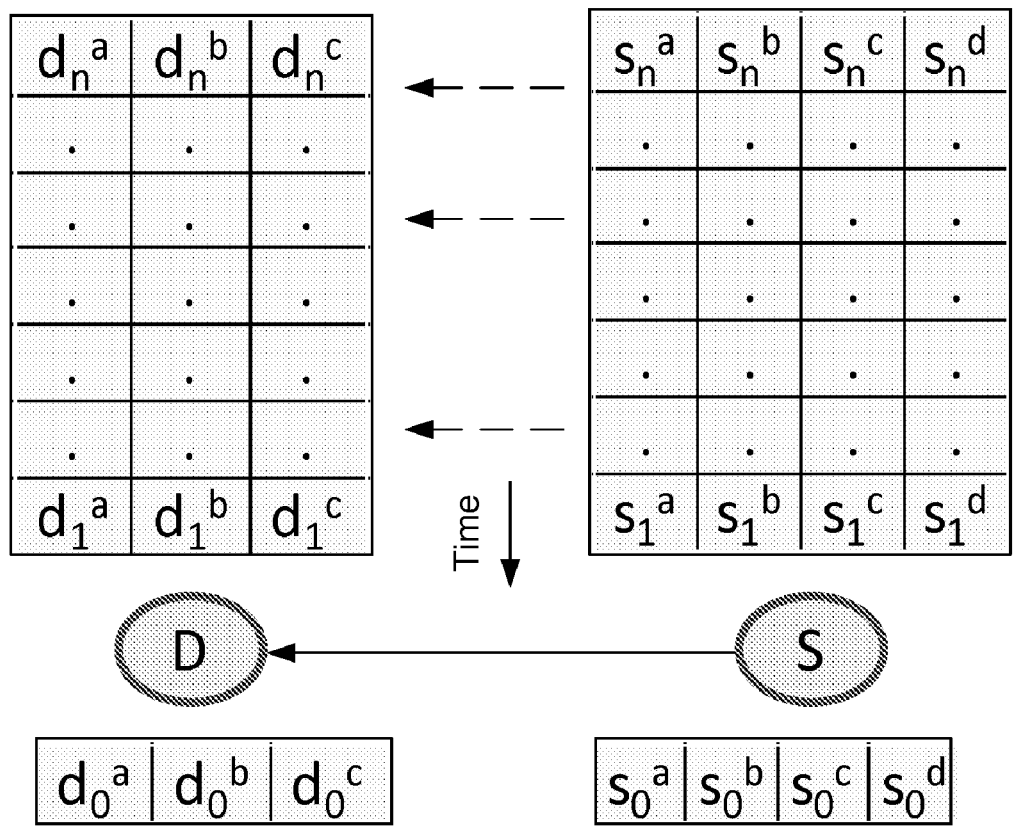
FIG. 5 illustrates a representation of joint historical behavior of a pair of components.

An example representation of joint historical behavior of two network components is illustrated in FIG. 5. As shown in FIG. 5, a representation of joint historical behavior of two network components, S and D, can include data structures for storing states of each of S and D. Each data structure includes a row or entry for a multi-variable vector of S/D at a given time. Thus, "$d_1{}^a d_1{}^b d_1{}^c$" represents the state of D at a time "1". A row/entry is broken into the constituent variables of the multi-variable vector. With respect to D, these are variables a, b, and c.

Figure 6:
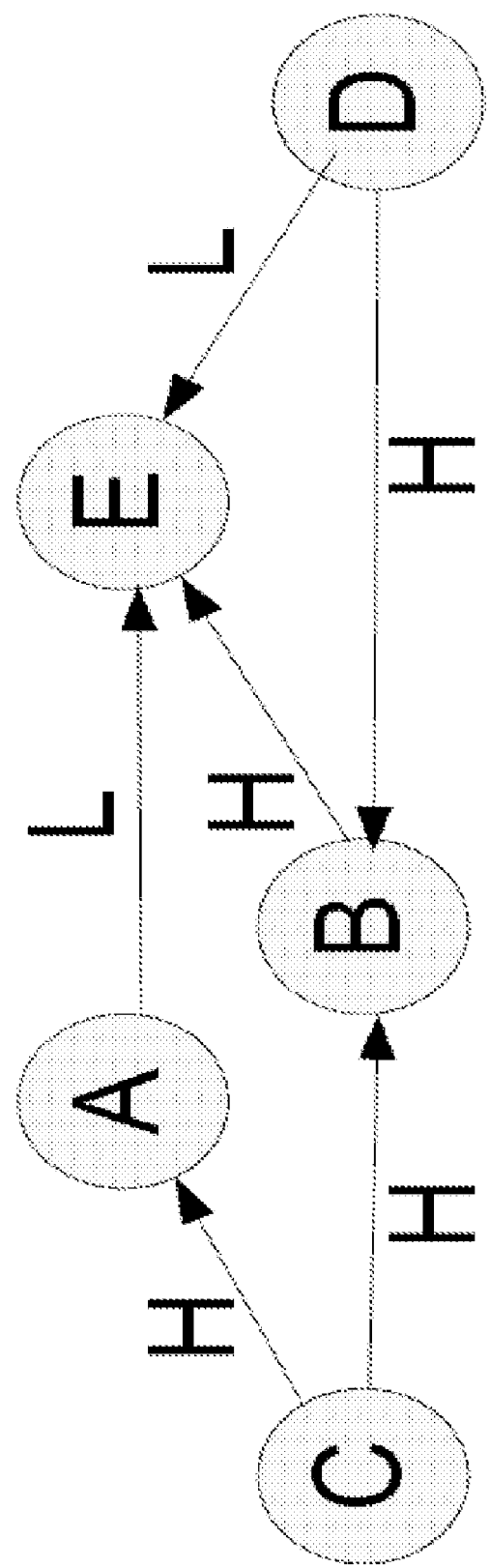
FIG. 6 illustrates a dependency graph of components.

In various implementations, the graph component 404 of the diagnostic system generates a dependency graph for the network components. FIG. 6 illustrates such a graph. As shown in FIG. 6, the dependency graph includes a node for each network component and an edge between any two components having a dependency relationship. The dependency graph of FIG. 6 shows five nodes labeled 'A', 'B', 'C', 'D', and 'E' representing five network components. In various implementations, the network components may be part of a single monitored computing device, such as a monitored computing device 206, or may be distributed among a plurality of monitored computing devices. Also, the edges of the dependency graph have directional arrows. The arrows in the dependency graph point to the dependent nodes. For example, node 'C' is connected to nodes 'A' and 'B' by two edges comprising arrows pointing at nodes 'A' and 'B'. By pointing at 'A' and 'B', the graph signifies that 'A' and 'B' are both dependent on node 'C'.

As is further shown in FIG. 6, each edge may be associated with a weight/likelihood. The computation of the weights/likelihoods is described further below.

To generate the dependency graph, the graph component 404 utilizes a set of templates, one template per network component type. For example, graph component 404 may utilize one template per application processes, another per configuration files, and yet others for other types.

Figure 7:
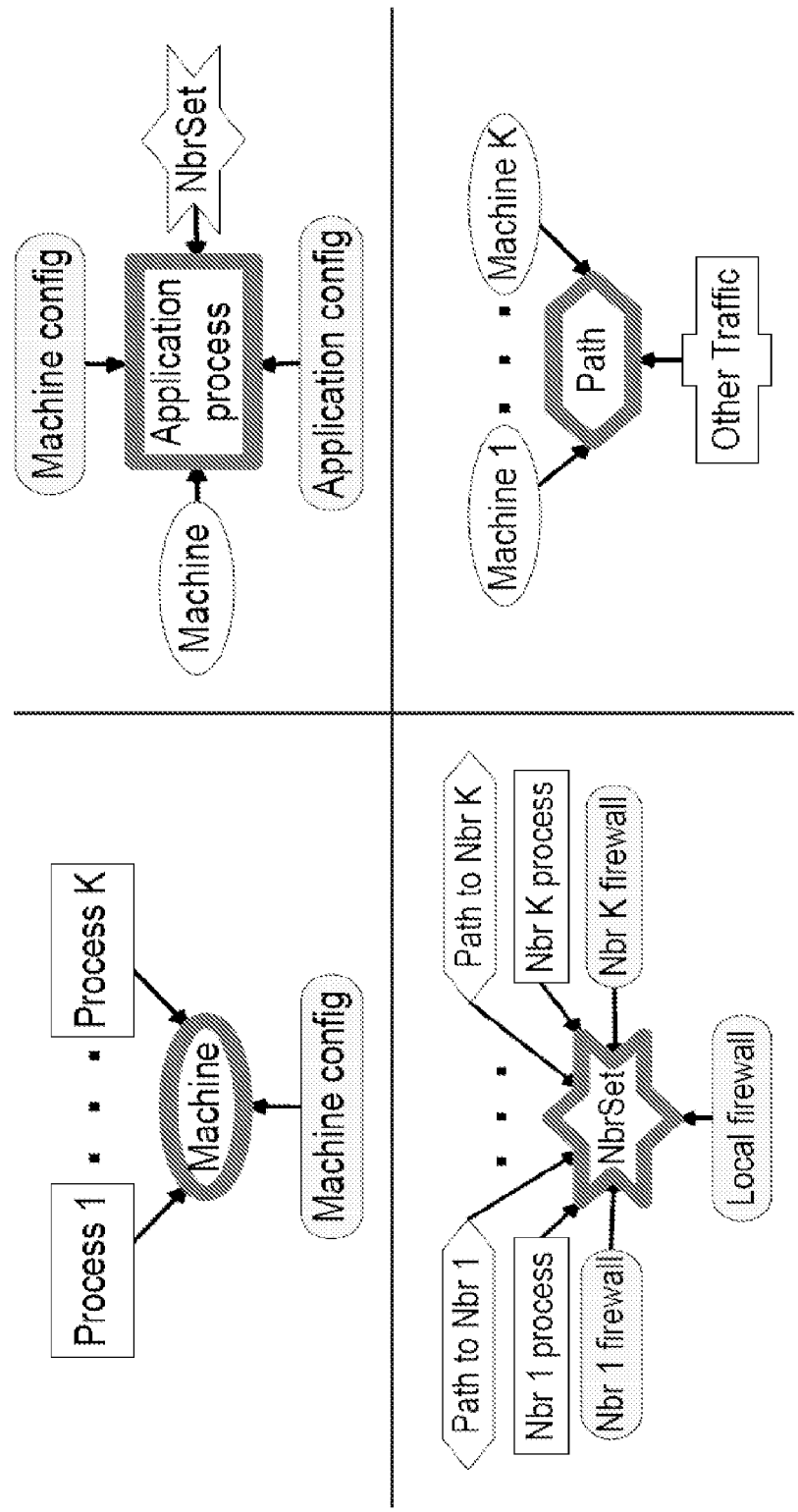
FIG. 7 illustrates a plurality of templates used by a diagnostic system to generate a dependency graph of components.

FIG. 7 illustrates a plurality of templates used by the graph component 404 to generate a dependency graph. Each template shows one network component in the center that corresponds to the network component type of the template. Thus, in FIG. 7, there are templates for a machine, an application process, a "NbrSet" (a virtual component that represents the collective behavior of peers of a process), and a path. Edges in the generated dependency graph correspond to edges in the templates, which illustrate dependency relationships between network components. As in the dependency graph shown in FIG. 6, the direction of the arrow signifies which component in each pair is dependent. And, while not shown in any template, dependency relationships can go both ways between two network components. Such a relationship would be represented by a bi-directional arrow.

In FIG. 7, a machine is shown as depending on its processes and on its configuration. An application process depends on its configuration, on the collective behavior of its communication peers (its "NbrSet"), its host machine, and on the configuration of the host machine A NbrSet depends on local and remote firewall configurations, the processes it is communicating with, and on network paths. Further, a network path between two machines depends on all machines that inject traffic into it and on the amount of other traffic from non-monitored systems.

In one implementation, there may be no template associated with a configuration component because the configuration component may not depend on other network components.

As is further illustrated by FIG. 4, the diagnostic component 406 of the diagnostic system 400 includes an abnormality detection module 408 for detecting abnormal behavior of a network component based on the received behavior metrics stored in the representation of the joint historical behavior.

The abnormality detection module 408 takes as input the received behavior metrics for a time period or the calculated averages for a time range. The abnormality detection module 408 then calculates, for each behavior metric, its average/mean and standard deviation over the historical time range included in the representation of the joint historical behavior. The behavior metric, the mean of its historical counterparts, and the standard deviation are then used by an error function (erf( )) defined as:

$$\left| \text{erf}\left( \frac{v - \mu}{\sigma \sqrt{2}} \right) \right|$$

where v is the value of the behavior metric, μ is the mean, and σ is the standard deviation. The error function calculates a result that is double the probability of seeing values between μ and v in a normal distribution with parameters μ and σ. The result ranges from 0 to 1, with results closer to 1 corresponding to behavior metrics that are far from the mean.

The abnormality detection module 408 then calculates the abnormality for a network component by selecting the maximum of the abnormalities calculated for its behavior metrics.

In various implementations, the abnormality detection module 408 then uses the calculated abnormality of a network component to decide whether the network component is performing abnormally. To make the decision, the calculated abnormality is compared to a threshold value, such as 0.8. If the calculated abnormality is greater than the threshold, the abnormality detection module 408 decides that the network component in question is behaving abnormally.

In other implementations, rather than automatically determining that a network component is behaving abnormally, the abnormality detection module 408 may receive an indication from a user that the behavior metrics indicate abnormal behavior. In yet other embodiments, some network components may be determined to be performing abnormally based on a decision of the abnormality detection module 408, while others may be indicated as performing abnormally by a user. The result of the abnormality detection module's 408 operations is a set of network components that are identified as behaving abnormally, as well as calculated measures of abnormality for network components.

In various implementations, once abnormalities have been detected or indicated, the likelihood module 410 computes likelihoods for pairs of network components that the behavior of one network component of a pair is impacting the other of the pair. Once computed, the likelihoods are assigned as weights to the edges of the dependency graph that correspond to the pairs for which the likelihoods are computed.

For pairs of network components for which one or both of the components are not identified as performing abnormally by the abnormality detection module 408, the likelihood module 410 assigns a low likelihood to the dependency relationship between the pair. A low likelihood is assigned because if either of the pair is acting normally, it is unlikely that one component of the pair is impacting the other. For example, the low likelihood could be quantitized to a edge weight of 0.1, and the 0.1 edge weight could be assigned to the edge represent the link between the pair of nodes on the dependency graph.

For pairs of network components for which both members of the pair are identified as performing abnormally by the abnormality detection module 408, the likelihood module 410 uses the joint historical behavior of the pair of network components, as stored in the representation of the joint historical behavior, to compute the likelihood that one component of the pair is impacting the behavior of the other component of the pair. To compute a likelihood, the likelihood module 410 identifies which network component of the pair is dependent on the other. This identification can be based, for example, on the directionality of the arrow of the edge between the pair of network components in the dependency graph. For purposes of the computation, the dependent node is regarded as a "destination node" D and the other component of the pair is regarded as the "source node S". Because D is dependent on S, the computed likelihood of impact reflects the likelihood that S is impacting D. For D to impact S, S would also have to be in some way dependent on D.

The likelihood module 410 then uses the multi-variable vector for each of S and D to determine states for S and D at a time that S and D were detected to be performing abnormally. These states are denominated as $S_{now}$ and $D_{now}$. After determining the states, the likelihood module 410 divides the history stored in the representation of the joint historical behavior, where both network components co-exist, into K equal sized chunks, each comprising one or more time bins/ranges. Within each chunk, the likelihood module 410 identifies the time range in which S was in a state most similar to $S_{now}$. The likelihood module 410 then computes how similar on average D was to $D_{now}$ during those times. That similarity, which is the computed likelihood that S is impacting D, is calculated by the function E(S→D), where E(S→D) is defined as:

$$E(S \to D) = \frac{\sum_{k=1}^{K}(1 - |D_{t_k} - D_{now}|) \times w_k}{\sum_{k=1}^{K} w_k}$$

where $w_k$ is defined as:

$$w_k = 1 - |S_{t_k} - S_{now}| \text{ if } |S_{t_k} - S_{now}| \leq \delta$$

and where E(S→D) is a likelihood/edge weight of an edge E that connects S and D, k is an index of one of the K chunks, $S_{t_k}$ is a state of S at a previous time $t_k$ that is most similar to $S_{now}$ of the previous states of S stored in the representation of the joint historical behavior, $D_{t_k}$ is a state of D at the previous time $t_k$, and δ is a threshold. Also, $|D_{t_k} - D_{now}|$ is the difference between the multi-variable vectors of the two states of D, the difference producing a number between 0 and 1. The value $w_k$ is a relative weighing factor that is calculated as shown above if $|S_{t_k} - S_{now}|$ does not exceed a threshold. If $|S_{t_k} - S_{now}|$ does exceeds the threshold, then $w_k = 0$. The reason for giving a higher weight to a lower value of $|S_{t_k} - S_{now}|$ is that a lower value of $|S_{t_k} - S_{now}|$ reflects a greater similarity of the two states. In one implementation the likelihood module 410 uses a value of ⅓ for δ.

To calculate the differences between states, the likelihood module 410 calculates the differences between the variables of the multi-variable vectors that comprise the states. The difference between two states with L variables is defined as:

$$\sum_{i=1}^{L} |di|/L$$

where $d^i$ is the difference of the i-th variable normalized over the joint historical behavior by performing:

$$d^i = (v_{t_k}^i - v_{now}^i)/(v_{max}^i - v_{min}^i)$$

where $v_{t_k}^i$ and $v_{now}^i$ are values of a variable v at two different times and $v_{max}^i$ and $v_{min}^i$ are maximum and minimum observed values of v found in the representation of the joint historical behavior. Normalization means that the difference for each variable is between 0 and 1. By normalizing, the likelihood module 410 ensures that a single variable doesn't dominate the calculation because its values are drawn from a larger range. If one of the network components being differenced is a configuration component, however, the likelihood module 410 assigns a value of zero if all variables are identical and a value of one if even one variable is different.

In some implementations, before calculating the difference between two states, the likelihood module may filter or de-emphasize one or more the variables for each state. Filtering or de-emphasizing helps overcome some of the difficulties of performing the calculation in a manner that is agnostic to the semantics of the variables. If the semantics were known, the likelihood module 410 could simply select the variables indicated by the semantics as being most relevant and ignore the rest. Without knowledge of semantics, however, filtering and de-emphasizing operations increase the accuracy of the calculation of the difference between the states.

In one implementation, the likelihood module 410 weighs the variables of each state by its abnormality. This abnormality may be the measure of abnormality of each behavior metric calculated by the abnormality detection module 408. As discussed above, the greater the abnormality, the closer the measure is to 1. The smaller the abnormality, the closer the measure is to zero. By using these measures of abnormalities as weights of the variables, the likelihood module 410 ensures that variables associated with more abnormal behavior are given greater weight.

In another implementation, the likelihood module 410 ignores redundant variables. For example, network components, such as machines, provide indications of used and available memory in units of bytes, kilobytes, and megabytes. In eliminating redundant measures, the likelihood module 410 may, for instance, eliminate five of the six variables representing memory availability and utilize only the one remaining in calculating differences between the states. The likelihood module 410 is configured to identify unique/non-redundant variables by computing linear correlations between pairs of variables for a network component, identify cliques of variables such that a Pearson correlation coefficient between every pair of variables is above a threshold (such as 0.8), and select one variable per clique, deeming the others to be redundant.

In a further implementation, the likelihood module 410 filters out variables that are irrelevant to interaction with the neighbor under consideration. For example, the likelihood module 410 would filter out variables of S that are irrelevant to interaction with D. To determine whether a variable is relevant to interaction with a neighbor, the likelihood module 410 checks if the variable is correlated to any of the neighbor's variables by computing a linear correlation between the variable and each variable of the neighbor. If the Pearson correlation coefficient between the variable and any of the variables of the neighbor is above a threshold (such as 0.8), the variable is considered relevant and is not filtered out.

In an additional implementation, the likelihood module 410 filters out variable(s) that are simply aggregations of other variables. To detect such aggregate variables, the likelihood module 410 finds variable names that are common to multiple network components. The likelihood module 410 then instantiates a virtual variable and assigns the virtual variable a value equal to the sum of the variables sharing the variable name. After instantiating the virtual variable, the likelihood module 410 then compares variable to the virtual variable and excludes those with a high degree of correlation (such as correlation with a coefficient exceeding 0.9).

In various implementations, the likelihood module 410 may apply any or all of the filtering and de-emphasizing operations in calculating the differences between the states. Once the differences between the states are known, they may be used to calculate $w_k$ and $E(S \rightarrow D)$, as described above.

The resulting likelihoods of the computations are then assigned to the edges E between the nodes S and D on the dependency graph for further use in determining the probable cause of the abnormal behavior. As shown in FIG. 6, each edge of the dependency graph, upon completion of the likelihood module's 410 operations, has an edge weight assigned to it. FIG. 6 shows these weights as either 'H—high—or 'L'—low. In practice, 'H' and 'L' would actually be values between 0 and 1, with 'H' representing values closer to 1, and 'L' representing values closer to 0.

In one implementation, when no useable joint historical behavior exists (because, for example, one of the network components is new to the network), the likelihood module 410 assigns a high likelihood/edge weight value to the edge between S and D (such as a likelihood of 0.8).

In various implementations, once likelihoods have been computed, the diagnostic component 406 may invoke the ranking module 412 to determine a probable cause of the detected/indicated abnormal behavior. To arrive at a probable cause, the ranking module 412 determines a ranking of probable causes by using the dependency graph and computed likelihoods. In one implementation, the ranking module 412 arrives at a ranking through use of a ranking function defined as:

$$\text{Rank}(c \rightarrow e) \propto (I(c \rightarrow e) \times S(c))^{-1}$$

where e is the network component that has been detected or indicated as performing abnormally, c is a network component that e is directly or indirectly dependent on, $I(c \rightarrow e)$ is the maximum weight $W(p)$ of acyclic paths p from c to e, where path weight is the geometric mean of all edge weights of a path, and $W(p)$ is further defined as:

$$W(p) = \left(\prod_{j=1}^{n} E(e_j)\right)^{\frac{1}{n}}$$

where $e_1 \ldots e_n$ are edges between c, e, and any intervening network components, $E()$ is the likelihood/edge weight associated with an edge, n is the number of edges between c and e and any intervening network components, $S(c)$ is a score of a global impact of c on all other network components that are dependent on c, and $S(c)$ is further defined as:

$$S(c) = \sum_{e \in C} I(c \rightarrow e) \times A_e$$

where C is a set of all network components and $A_e$ is a measure of abnormal behavior of e (i.e., the calculated abnormality of e, which is discussed above in greater detail).

The result of the ranking function is a ranking of one or more network components as probable causes of another network component that directly or indirectly depends on the ranked network components.

Once the ranking/probable cause has been determined, the diagnostic system 400 can utilize the determined probable cause/ranking of probable causes to remedy the abnormal behavior or inform a network operator of the probable cause/ranking.

To inform the network operator, the diagnostic system 400 may provide an indication of the determined probable cause or the ranking of probable causes to the network operator, via visual or audible mechanisms. Also or instead, the diagnostic system 400 may provide a user interface to the network operator that is configured to enable the network operator to view both the determined probable cause/ranking of probable causes and the details of the computations utilized to determine the probable cause/ranking. Such details could include details associated with monitoring the behavior metrics, generating the dependency graph, detecting the abnormally performing network components, computing the likelihoods, and determining the probable cause or determining the ranking of probable causes. The network operator may be associated with a designated system of the monitored network and the indication/user interface may be delivered by the diagnostic system 400 to the network operator system. In one implementation, the diagnostic system 400 and network operator system may be the same computer system.

To remedy the abnormal behavior, the diagnostic system 400 may provide an indication of the determined probable cause/ranking of probable causes to a rules-based engine configured to perform remedial measures. Such rules-based engines are known in the art and need not be described further. In other implementations, the diagnostic system may instead provide an indication of the determined probable cause/ranking of probable causes to a knowledge base of remedies to enable the knowledge base to suggest a remedy to the network operator or automatically implement a remedy. Such a knowledge base may be cumulative, growing with each reported abnormality and probable cause of that abnormality.

Figure 8A:
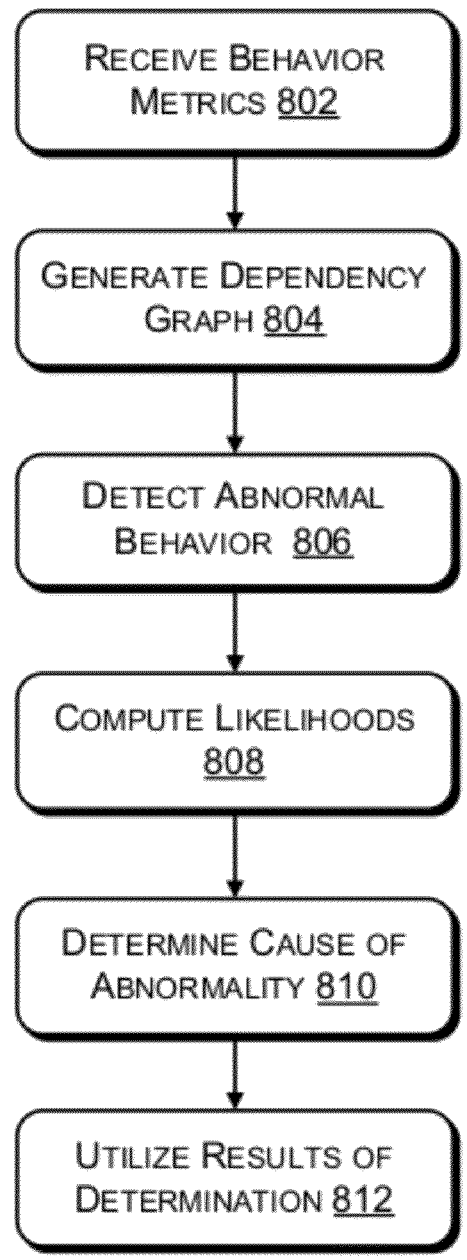
FIGS. 8A-8B illustrate flowcharts showing an example method of determining a probable cause of abnormal behavior of a component.
Figure 8B:
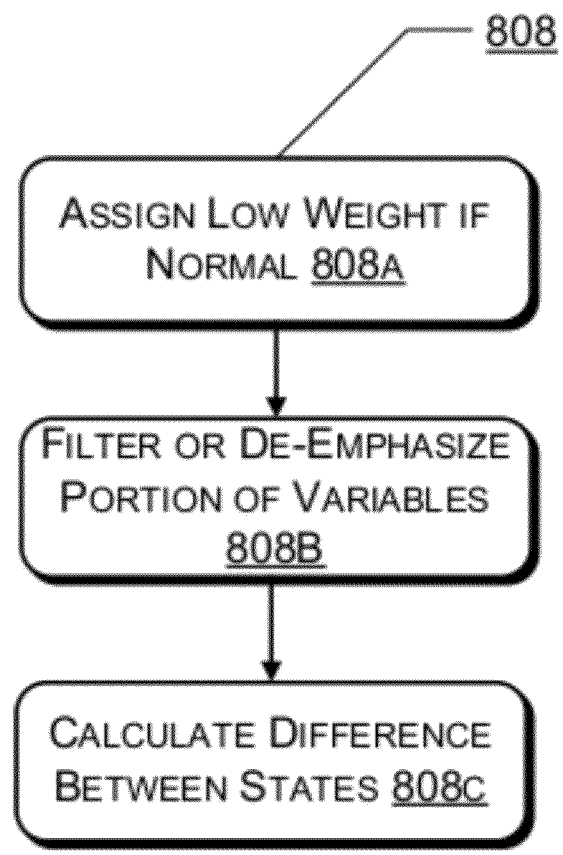

FIGS. 8A-8B illustrate flowcharts showing a method of determining a probable cause of abnormal behavior of a component, such as a network component. As illustrated in FIG. 8A, a diagnostic system may periodically receive a plurality of behavior metrics for one or more of a plurality of network components, block 802, the one or more of the network components each having a state represented as a multi-variable vector of behavior metrics.

In various implementations, the diagnostic system may then generate a dependency graph for the plurality of network components, block 804, each network component represented as a node in the dependency graph and each dependency relationship between a pair of network components represented as an edge between two nodes. In one implantation, the generating, block 804, further comprises automatically generating the dependency graph using a plurality of templates, each template associated with a different network component type.

Once metrics have been received and the dependency graph has been generated, the diagnostic system may detect abnormal behavior of the at least one other network component based on behavior metrics of the network component and historical values of those behavior metrics, block 806. In one implementation, instead of or in addition to detecting, block 806, the diagnostic system may receive an indication from a network operator that network component is abnormally performing.

In response to detecting abnormal behavior or receiving an indication of such behavior, the diagnostic system may, for each pair of network components having a dependency relationship, compute a likelihood that behavior of one network component of the pair is impacting behavior of the other network component of the pair, block 808. In various implementations, the computing may be based on joint historical behavior of the pair of network components. Also, the computing, block 808, may be agnostic with respect to semantics of behavior metrics comprising the joint historical behavior.

As shown in FIG. 8B, the computing, block 808 may further comprise assigning a low likelihood/edge weight to a dependency relationship/graph edge if either node of the pair is performing normally at the time the abnormality is detected, block 808A. Also, in some implementations, the diagnostic system may filter out or de-emphasize a portion of the variables of a multi-variable vector which defines a state of one of the pair of network components at a given point in time, block 808B, the multi-variable vector including multiple variables associated with multiple behavior metrics of one of the network components. In one implementation, a variable is de-emphasized if the variable indicates normal behavior. Also, a variable may be filtered out if the variable is redundant with respect to other variables, is irrelevant with respect to interaction between network components, or is an aggregate variable that aggregates other variables. The diagnostic system then utilizes the states represented by the multi-variable vectors to calculate differences between the states, block 808C, the differences to be used in a computation of the likelihood that one network component of a pair is impacting the other.

Referring again to FIG. 8A, once the likelihoods have been computed, the diagnostic system may determine that one of the plurality of network components is a probable cause of abnormal behavior of at least one other network component of the plurality of network components based on the computed likelihoods, block 810. In some implementations, the determining, block 810, further comprises determining a ranking of network components that are probable causes of the abnormal behavior.

In various implementations, after determining a probable cause or a ranking of probable causes, the diagnostic system may utilize results of the determination to remedy the abnormal behavior or inform a network operator, block 812. The remedying or informing, block 812, may include one of more of: providing an indication of the determined network component to the network operator; providing an indication of the determined network component to a rules-based engine configured to perform remedial measures; providing a user interface to the network operator that is configured to enable the network operator to view details associated with the computing and the determining; or provide an indication of the determined network component to a knowledge base of remedies to enable the knowledge base to suggest a remedy to the network operator.

FIG. 9 shows an exemplary computing device 900 such as may be used as a monitored computing device 206 or as a diagnostic system 400. In various embodiments, computing device 900 may include at least one processing unit 902 and system memory 904. Depending on the exact configuration and type of computing device, system memory 904 may be volatile (such as RAM), non-volatile (such as ROM, flash memory, etc.) or some combination of the two. System memory 904 may include an operating system 905, one or more program modules 906, and may include program data 907.

Computing device 900 may also include additional data storage devices (removable and/or non-removable) such as, for example, magnetic disks, optical disks, or tape. Such additional storage is illustrated in FIG. 9 by removable storage 909 and non-removable storage 910. Computer-readable storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer-readable storage media may be part of device 900.

In various embodiment, any or all of system memory 904, removable storage 909, and non-removable storage 910, may store programming instructions which, when executed, implement some or all of the above-described operations of the monitored computing device 206 or the diagnostic system 400.

Computing device 900 may also have input device(s) 912 such as a keyboard, a mouse, a touch-sensitive display, voice input device, etc. Output device(s) 914 such as a display, speakers, a printer, etc. may also be included. These devices are well know in the art and need not be discussed at length here.

Computing device 900 may also contain communication connections 916 that allow the device to communicate with other computing devices 918.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A system comprising:
   a processor; and
   a graph component configured to be operated by the processor to generate a dependency graph for a plurality of network components, each network component represented as a node in the dependency graph and each dependency relationship between a pair of network components represented as an edge between two nodes;
   a diagnostic component configured to be operated by the processor to perform operations including:
      detecting abnormal behavior of a first network component of the plurality of network components based on behavior metrics of the first network component and historical values of those behavior metrics;
      for each pair of network components of the plurality of network components having a dependency relationship, computing a likelihood that behavior of one network component of the pair is impacting behavior of the other network component of the pair, the computing being based on joint historical behavior of the pair of network components; and
      determining that a second network component of the plurality of network components is a probable cause of the detected abnormal behavior of the first network component based on the computed likelihoods,
      wherein magnitudes of the computed likelihoods are directly proportional to magnitudes of differences between behavior metrics and historic values of those behavior metrics for the pairs of network components associated with the computed likelihoods.

2. The system of claim 1, wherein the computing is agnostic with respect to semantics of behavior metrics comprising the joint historical behavior.

3. A method implemented by a computing device, the method comprising:
   for each pair of components of a plurality of components having a dependency relationship, computing a likelihood that behavior of one component of the pair is impacting behavior of the other component of the pair, the computing being based on joint historical behavior of the pair of components; and
   determining that one of the plurality of components is a probable cause of abnormal behavior of at least one other component of the plurality of components based on the computed likelihoods,
   wherein magnitudes of the computed likelihoods are directly proportional to magnitudes of differences between behavior metrics and historic values of those behavior metrics for the pairs of components associated with the computed likelihoods.

4. The method of claim 3, further comprising detecting abnormal behavior of the at least one other component based on behavior metrics of the component and historical values of those behavior metrics.

5. The method of claim 3, further comprising periodically receiving a plurality of behavior metrics for one or more of the plurality of components, the one or more of the components each having a state represented as a multi-variable vector of behavior metrics.

6. The method of claim 5, wherein the behavior metrics include computer processing unit utilization, memory usage, disk usage, amount of network traffic and other input and output, response times, loss rate, delay, and key-value pairs.

7. The method of claim 3, wherein the components include application processes, operating systems, network paths, configuration files, and virtual components that represent collective behavior of communication peers of other components that are network components.

8. The method of claim 3, further comprising generating a dependency graph for the plurality of components, each component represented as a node in the dependency graph and each dependency relationship between a pair of components represented as an edge between two nodes.

9. The method of claim 8, wherein the generating further comprises automatically generating the dependency graph using a plurality of templates, each template associated with a different component type.

10. The method of claim 8, wherein the computed likelihoods are assigned as edge weights to edges of the dependency graph, and each edge weight is defined as:

$$E(S \to D) = \frac{\sum_{k=1}^{K}(1 - |D_{t_k} - D_{now}|) \times w_k}{\sum_{k=1}^{K} w_k}$$

where $w_k$ is defined as:

$$w_k = 1 - |S_{t_k} - S_{now}| \text{ if } |S_{t_k} - S_{now}| \leq \delta$$

and where $E(S \to D)$ is an edge weight of an edge E, S is a source node of E, D is a destination node of E, K is a number of chunks of the joint historical behavior, k is one of the chunks, $S_{now}$ is a state of S at a time when an abnormality is detected, $D_{now}$ is a state of D at the time when the abnormality is detected, $s_{t_k}$ is a state of S or at a previous time $t_k$ that is most similar to $S_{now}$ of the previous states of S stored in the joint historical behavior, $D_{t_k}$ is a state of D at the previous time $t_k$ and $\delta$ is a threshold.

11. The method of claim 10, further comprising, if either or both of S and D is performing normally at the time when the abnormality is detected, assigning a low weight to $E(S \to D)$.

12. The method of claim 10, wherein the difference between two states is the difference between vectors associated with the two states, each vector having L variables, the difference being defined as:

$$\sum_{i=1}^{L} |d^i|/L$$

where $d^i$ is the difference of the i-th variable normalized over the joint historical behavior by performing:

$$d^i = (v_{t_k}^i - v_{now}^i)/(v_{max}^i - v_{min}^i)$$

where $v_{t_k}^i$ and $v_{now}^i$ are values of a variable v at two different times and $v_{max}^i$ and $v_{min}^i$ are maximum and minimum observed values of v found in the joint historical behavior.

13. The method of claim 3, wherein the determining further comprises determining a ranking of components that are probable causes of the abnormal behavior.

14. The method of claim 13, wherein the ranking of the components is defined as:

$$\text{Rank}(c \to e) \propto (I(c \to e) \times S(c))^{-1}$$

where c and e are components having a direct or indirect dependency relationship, $I(c \to e)$ is the maximum weight W(p) of acyclic paths p from c to e, and W(p) is further defined as:

$$W(p) = \left(\prod_{j=1}^{n} E(e_j)\right)^{\frac{1}{n}}$$

where $e_1 \ldots e_n$ are dependency relationships between c, e, and any intervening components, E( ) is the likelihood for a dependency relationship, n is the number of dependency relationships between c and e and any intervening components, S(c) is a score of a global impact of c on all other components that are dependent on c, and S(c) is further defined as:

$$S(c) = \sum_{e \in C} I(c \to e) \times A_e$$

where C is a set of all components and $A_e$ is a measure of abnormal behavior of e.

15. The method of claim 3, further comprising utilizing results of the determination to remedy the abnormal behavior or inform an operator, the utilizing including one or more of:
providing an indication of the determined component to the operator;
providing an indication of the determined component to a rules-based engine configured to perform remedial measures;
providing a user interface to the operator that is configured to enable the operator to view details associated with the computing and the determining; or
providing an indication of the determined component to a knowledge base of remedies to enable the knowledge base to suggest a remedy to the operator.

16. An article of manufacture comprising:
one or more tangible storage devices storing computer executable instructions that, when executed by a computing device, cause the computing device to perform operations including:
detecting abnormal behavior of a first network component of a plurality of network components based on behavior metrics of the first network component and historical values of those behavior metrics;
for each pair of the network components having a dependency relationship, computing a likelihood that behavior of one network component of the pair is impacting behavior of the other network component of the pair, the computing being based on joint historical behavior of the pair of network components; and
determining that a second network component of the network components is a probable cause of abnormal behavior of the first network component based on the computed likelihoods,
wherein magnitudes of the computed likelihoods are directly proportional to magnitudes of differences between behavior metrics and historic values of those behavior metrics for the pairs of network components associated with the computed likelihoods.

17. The article of claim 16, wherein the detecting comprises calculating, for each behavior metric, a mean and standard deviation of the historical values of that behavior metric, and utilizing the behavior metric, the mean, and the standard deviation in an error function defined as:

$$\left| \text{erf}\left(\frac{v - \mu}{\sigma\sqrt{2}}\right) \right|$$

where v is the value of the behavior metric, μ is the mean, and σ is the standard deviation.

18. The article of claim 16, wherein the computing further comprises:
utilizing states of each of the pair of network components at different points in time to calculate the likelihood, each state defined by a multi-variable vector that includes multiple variables associated with multiple behavior metrics of one of the network components; and
filtering out or de-emphasizing a portion of the variables the multi-variable vectors.

19. The article of claim 18, wherein a variable is de-emphasized if the variable indicates normal behavior.

20. The article of claim 18, wherein a variable is filtered out if the variable is redundant with respect to other variables, is irrelevant with respect to interaction between network components, or is an aggregate variable that aggregates other variables.

* * * * *